United States Patent
Lu

(10) Patent No.: US 12,508,167 B2
(45) Date of Patent: Dec. 30, 2025

(54) WOUND DRESSING AND MANUFACTURING METHOD THEREOF

(71) Applicant: Darwin Precisions Corporation, Hsinchu County (TW)

(72) Inventor: Chi-Ying Lu, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 274 days.

(21) Appl. No.: 18/315,950

(22) Filed: May 11, 2023

(65) Prior Publication Data

US 2024/0238127 A1    Jul. 18, 2024

(30) Foreign Application Priority Data

Jan. 18, 2023   (TW) .................. 112102377

(51) Int. Cl.
| | | |
|---|---|---|
| A61F 13/00 | (2024.01) | |
| A61F 13/01 | (2024.01) | |
| A61F 13/02 | (2024.01) | |
| A61N 1/04 | (2006.01) | |
| A61N 1/32 | (2006.01) | |

(52) U.S. Cl.
CPC .. A61F 13/01034 (2024.01); A61F 13/00991 (2013.01); A61F 13/01012 (2024.01); A61F 13/01029 (2024.01); A61N 1/0468 (2013.01)

(58) Field of Classification Search
CPC ............... A61F 13/00; A61F 13/00008; A61F 13/00021; A61F 13/00089; A61F 13/01034; A61F 13/01042; A61F 13/0206; A61F 2013/00246; A61F 2013/00251; A61F 2013/00255; A61F 2013/00634; A61F 2013/00744; A61F 2013/00757; A61F 2013/00778; A61F 2013/00782; A61F 2013/00859; A61F 2013/00863; A61F 2013/15934; A61F 2013/53062; A61L 31/146
See application file for complete search history.

(56) References Cited

U.S. PATENT DOCUMENTS

| | | | |
|---|---|---|---|
| 2010/0211151 A1 | 8/2010 | Scott-Carnell | |
| 2011/0280926 A1* | 11/2011 | Junginger | A61F 13/00991 156/60 |
| 2015/0242001 A1* | 8/2015 | Stojanovski | A61F 13/0226 602/42 |
| 2018/0326201 A1 | 11/2018 | Nagel | |
| 2020/0146896 A1* | 5/2020 | Rice | A61M 1/915 |

(Continued)

FOREIGN PATENT DOCUMENTS

| | | |
|---|---|---|
| CN | 206508295 U | 9/2017 |
| CN | 207101546 U | 3/2018 |

(Continued)

*Primary Examiner* — Alireza Nia
*Assistant Examiner* — Andrew Jun-Wai Mok
(74) *Attorney, Agent, or Firm* — WPAT, PC

(57) ABSTRACT

A wound dressing is provided in some embodiments of the present disclosure. The wound dressing includes a porous substrate and a functional layer disposed on the porous substrate. The functional layer is charged or has conductivity. A method of manufacturing a wound dressing is further provided in some embodiments of the present disclosure.

7 Claims, 7 Drawing Sheets

(56) References Cited

U.S. PATENT DOCUMENTS

2020/0268808 A1    8/2020   Wang
2022/0096730 A1    3/2022   Robinson et al.

FOREIGN PATENT DOCUMENTS

| CN | 109276370 | A | 1/2019 |
|----|-----------|---|--------|
| CN | 113301873 | A | 8/2021 |
| TW | 200800375 | A | 1/2008 |
| TW | I655005 | B | 4/2019 |
| TW | I778656 | B | 9/2022 |
| WO | WO2021207516 | A1 | 10/2021 |

* cited by examiner

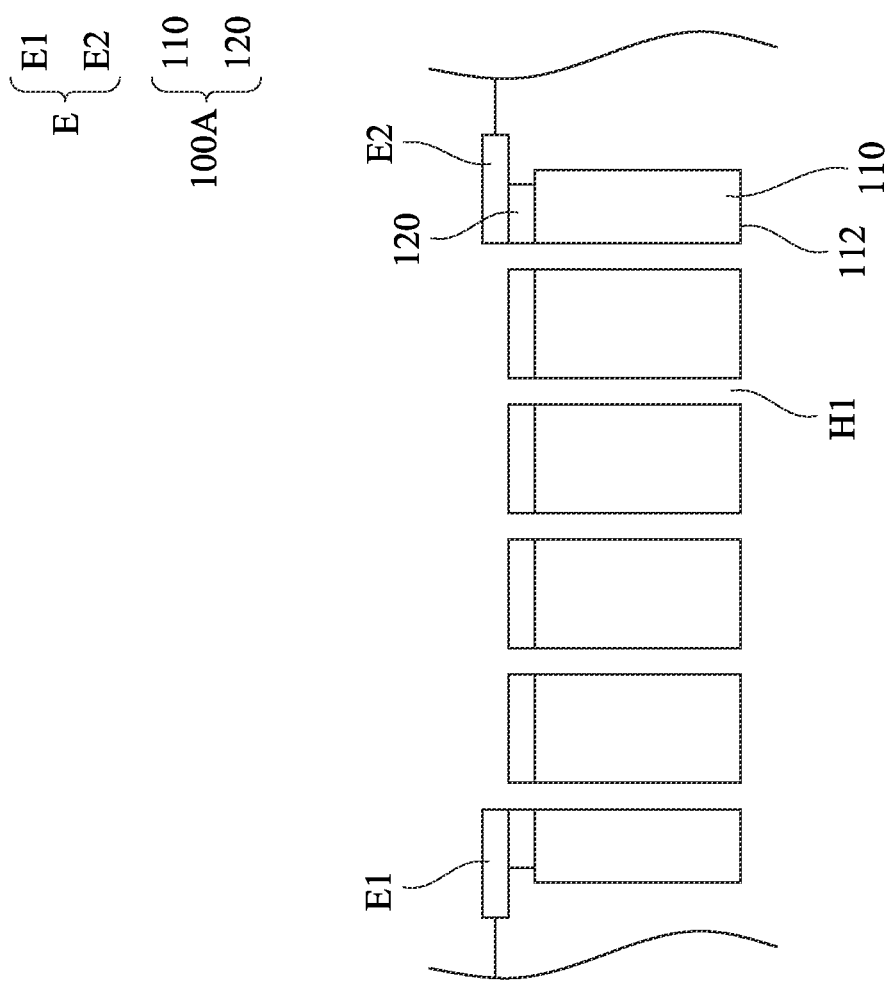

WOUND DRESSING AND MANUFACTURING METHOD THEREOF

CROSS-REFERENCE TO RELATED APPLICATION

This application claims priority to Taiwan Application Serial Number 112102377, filed Jan. 18, 2023, which is herein incorporated by reference.

BACKGROUND

Field of Invention

The present disclosure relates to a wound dressing and a manufacturing method thereof. More particularly, the present disclosure relates to a wound dressing capable of generating a microcurrent.

Description of Related Art

Bacterial biofilm infection is a major cause of delayed wound healing. Microcurrents can disrupt messaging between bacteria, which in turn interferes with the formation of biofilm and accelerates wound healing.

For the foregoing reason, there is a need to solve the above-mentioned problem by providing a wound dressing capable of providing a microcurrent.

SUMMARY

Some embodiments of the present disclosure provide a wound dressing including a porous substrate and a functional layer disposed on the porous substrate. The functional layer is charged or has conductivity.

In the foregoing, a material of the porous substrate includes a metal, an organic polymer, a fiber, or a combination thereof.

In the foregoing, a material of the functional layer includes a metal, an organic polymer, a graphite, or a combination thereof.

In the foregoing, a thickness of the porous substrate is from 5 μm to 1000 μm.

In the foregoing, the porous substrate has an upper surface, a lower surface opposite to the upper surface, and a plurality of holes extending from the upper surface to the lower surface.

In the foregoing, the holes are a plurality of columnar holes, a plurality of conical holes, or a combination thereof.

In the foregoing, when the holes are the plurality of columnar holes, the functional layer is disposed on the upper surface of the porous substrate.

In the foregoing, a diameter of each of the plurality of columnar holes is from 10 nm to 500 nm.

In the foregoing, when the plurality of holes are the plurality of conical holes, the functional layer is disposed on a sidewall of each of the plurality of conical holes, and the functional layer is charged.

In the foregoing, two opposite sides of each of the plurality of conical holes respectively have a maximum radius and a minimum radius. The minimum radius is from 10 nm to 50 nm.

In the foregoing, materials of the functional layer and the porous substrate are different.

In the foregoing, materials of the functional layer and the porous substrate are the same.

Some embodiments of the present disclosure provide a method of manufacturing a wound dressing. The method includes providing a porous substrate; and disposing a functional layer on the porous substrate, in which the functional layer is charged or has conductivity.

In the foregoing, the functional layer includes a functional layer material that has conductivity on an upper surface of the porous substrate.

In the foregoing, the step of providing the porous substrate includes providing an initial substrate, in which the initial substrate has an upper surface and a lower surface opposite to the upper surface; and etching the initial substrate to form a plurality of conical holes extending from the upper surface to the lower surface.

In the foregoing, the step of disposing the functional layer on the porous substrate includes coating a functional layer material that is charged on a sidewall of each of the plurality of conical holes.

In the foregoing, the step of disposing the functional layer on the porous substrate includes performing a plasma modification on a sidewall of each of the plurality of conical holes, so that a surface of the sidewall is charged.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. Wherever possible, the same reference numbers are used in the drawings and the description to refer to the same or like parts.

FIG. 2C depicts a cross-sectional view of a schematic diagram of an external electrode acting on a wound dressing according to some embodiments of the present disclosure;

DESCRIPTION OF THE EMBODIMENTS

Figure 1:
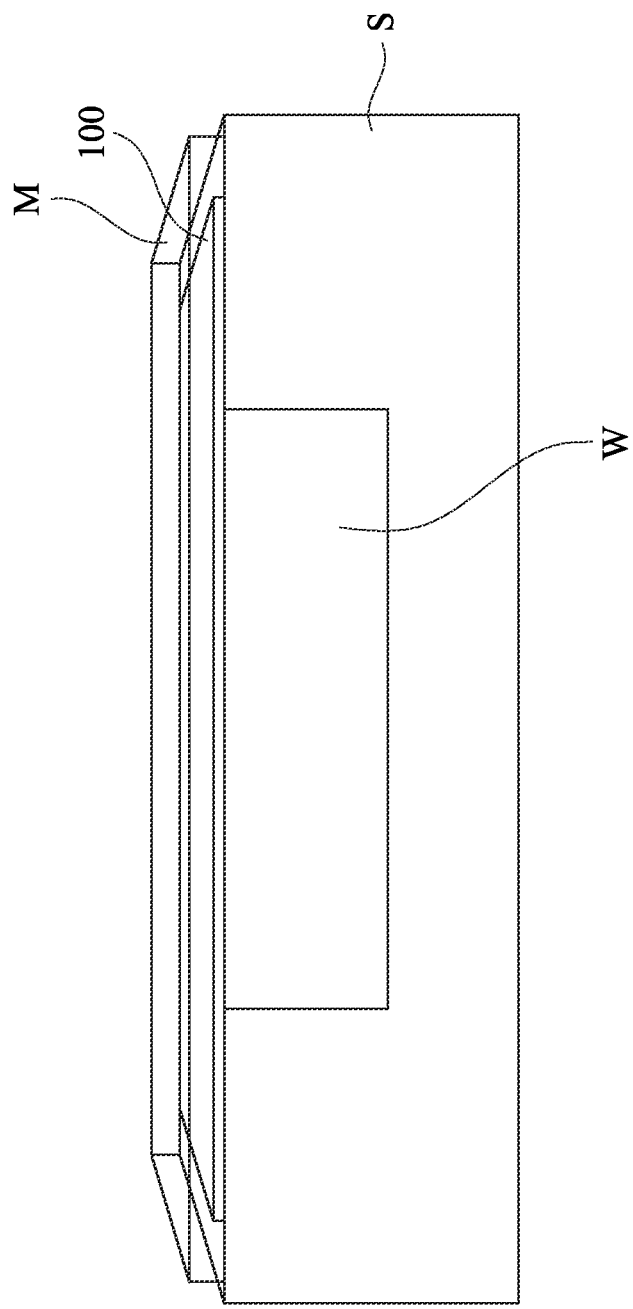
FIG. 1 depicts a schematic diagram of a wound dressing applied to a wound in skin according to some embodiments of the present disclosure.

It will be understood that when an element, such as a layer, a film, a region or substrate, is referred to as being "on" or "connected to" another element, it can be directly on another element or directly connected to another element or intervening elements may also be present. In contrast, when an element is referred to as being "directly on" or "directly connected to" another element, there are no intervening elements present. As used herein, "connect" refers to physical and/or electrical connect. Moreover, "electrically connect" or "couple" can refer to an intervening element(s) present between two elements.

Furthermore, relative terms, such as "lower" or "bottom" and "upper" or "top", may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" side of the other elements. The exemplary term "lower", can therefore, encompasses both an orientation of "lower" and "upper", depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of "above" and "below".

As used herein, "about," "approximately," or "substantially" includes the value and average values within acceptable deviations of the particular value determined by one of ordinary skill in the art, in consideration of the measurements discussed and the specific amounts of errors associated with the measurements (that is, limitation of the measurement system). For example, "about" can mean within one or more standard deviations of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the relevant art and in the context of the present disclosure, and will not be interpreted in an idealized or overly formal sense unless expressly so defined herein.

It should be noted that, unless otherwise stated, when the following embodiments are depicted or described as a series of operations or events, the description order of these operations or events should not be limited. For example, some operations or events may have a different order from those described in the present disclosure, some operations or events may occur simultaneously, some operations or events may not be required, and/or some operations or events may be repeated. Furthermore, additional operations may be performed before, during, or after each step of the actual process to fully form the wound dressing. Therefore, the present disclosure will probably briefly describe some of these additional operations.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Therefore, the scope of the present disclosure is to be limited only by the appended claims.

First, a description is provided with reference to FIG. 1. FIG. 1 depicts a schematic diagram of a wound dressing 100 applied to a wound W in skin S. The wound dressing 100 is fixed onto the wound W via a breathable material M.

The wound dressing 100 includes a porous substrate and a functional layer disposed on the porous substrate. The functional layer is charged (that is, a surface is positively charged or negatively charged when there is no external current), or the functional layer has conductivity (the porous substrate and the functional layer are not shown in FIG. 1, and the specific elements may be referred to the following embodiments 1 and 2). It is worth emphasizing that the wound dressing 100 can absorb charged ions of the tissue fluid of the wound W or of the moisture in the air, and then through the action of an external electrode or through a hole shape of the porous substrate in cooperation with the functional layer that is charged, to spontaneously generate unidirectional microcurrents to act on the wound W, so as to inhibit the growth of bacterial biofilm in the wound W, and promote wound healing.

In some embodiments, a material of the porous substrate includes a metal, an organic polymer, a fiber, or a combination thereof. The fiber can be washed repeatedly to reduce waste of resources. Adopting the metal or the organic polymer facilitates an etching process and precise shaping can be further performed.

In some embodiments, a material of the functional layer includes a metal, an organic polymer, a graphite, or a combination thereof. In some embodiments, the material of the function layer may be the same as or different from that of the porous substrate.

In some embodiments, the porous substrate has an upper surface, a lower surface opposite to the upper surface, and a plurality of holes extending from the upper surface to the lower surface, such as a plurality of columnar holes, a plurality of conical holes, or a combination thereof. In some embodiments, a thickness of the porous substrate is from 5 microns (μm) to 1000 μm, such as 5 μm, 10 μm, 20 μm, 50 μm, 100 μm, 200 μm, 300 μm, 400 μm, 500 μm, 600 μm, 700 μm, 800 μm, 900 μm, 1000 μm, or any value within the above range. In some embodiments, a porosity of the porous substrate is from 20% to 60%, such as 20%, 30%, 40%, 50%, 60%, or any value within the above range. When the wound dressing 100 is applied to the wound W, the moisture in the air or the tissue fluid of the wound W can fill up the holes, so that the microcurrents can be transmitted to the wound W through the holes. Therefore, if the thickness of the porous substrate is too thick or the porosity is too low, the current transmission efficiency is lower.

In some embodiments, when these holes are columnar holes, the functional layer is disposed on the upper surface of the porous substrate, and the functional layer has conductivity. In one embodiment, the functional layer does not cover the columnar holes of the porous substrate. In some embodiments, a diameter of each of the columnar holes is from 10 nanometers (nm) to 500 nm, such as 10 nm, 50 nm, 100 nm, 200 nm, 300 nm, 400 nm, 500 nm, or any value within the above range. If the diameter of the columnar holes is too small, the current transmission efficiency is lower. It can be understood that the moisture in the air or the tissue fluid of the wound W can fill up the columnar holes, and a potential difference generated by the external electrode can drive electrons and charged ions to move, thus forming microcurrents that are transmitted to the wound W. In addition, the conductivity of the functional layer can achieve the effects of improving the transmission efficiency and maintaining the long-term microcurrents.

In some embodiments, when these holes are conical holes, the functional layer is disposed on a sidewall of each of the conical holes, and the functional layer is charged. The moisture in the air or the tissue fluid of the wound W can fill up the conical holes. The conical holes and the design that the functional layer is charged can allow the wound dressing 100 to generate microcurrents by itself, without the necessity of being driven by the external electrode.

In some embodiments, two opposite sides of each of the conical holes respectively have a maximum radius and a minimum radius. The minimum radius is from 10 nm to 50 nm, such as 10 nm, 20 nm, 30 nm, 40 nm, 50 nm, or any value within the above range. When the minimum diameter of the conical holes is too large, a distance between the charged ions is too large. It is thus difficult to form the potential difference, and effective microcurrents can not be generated. On the contrary, when the minimum radius of the conical holes is too small, it is difficult for the charged ions to move efficiently, and the microcurrent transmission efficiency is not good. In some embodiments, when these holes are conical holes, the materials of the functional layer and the porous substrate are different. For example, the functional layer adopts an ionic membrane layer (surface chargeability). In some other embodiments, when these holes are conical holes, the materials of the functional layer and the porous substrate are the same. For example, both the functional layer and the porous substrate are metal or organic polymer, but the surface of the functional layer is negatively charged or positively charged.

Some embodiments of the present disclosure further provide a method of manufacturing a wound dressing 100. The method includes providing a porous substrate, and disposing a functional layer on the porous substrate. The functional layer is charged or has conductivity.

In some embodiments, the porous substrate includes the porous substrate having a plurality of columnar holes. The porous substrate has an upper surface and a lower surface opposite to the upper surface. These columnar holes extend from the upper surface to the lower surface. In some embodiments, the porous substrate adopts a fiber. In some embodiments, the functional layer includes a functional layer material that has conductivity on the upper surface of the porous substrate.

In some embodiments, the step of providing the porous substrate includes providing an initial substrate, in which the initial substrate has an upper surface and a lower surface opposite to the upper surface; and etching the initial substrate to form a plurality of conical holes extending from the upper surface to the lower surface to obtain the porous substrate. In some embodiments, the step of disposing the functional layer on the porous substrate includes coating the functional layer material (such as an ionic membrane layer) that is charged on a sidewall of each of the conical holes. In some embodiments, the functional layer material may be annealed after the step of coating the functional layer material. In some embodiments, the step of disposing the functional layer on the porous substrate includes performing a plasma modification on the sidewall of each of the conical holes, so that the surfaces of the sidewalls are charged to obtain the functional layer that is charged.

A further description for specific examples of the wound dressing 100 is provided as follows.

Figure 2A:
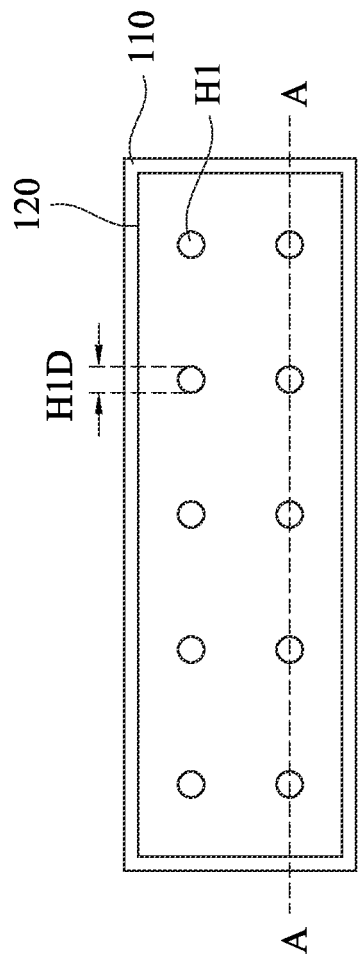
FIG. 2A depicts a top view of a wound dressing according to some embodiments of the present disclosure.
Figure 2B:
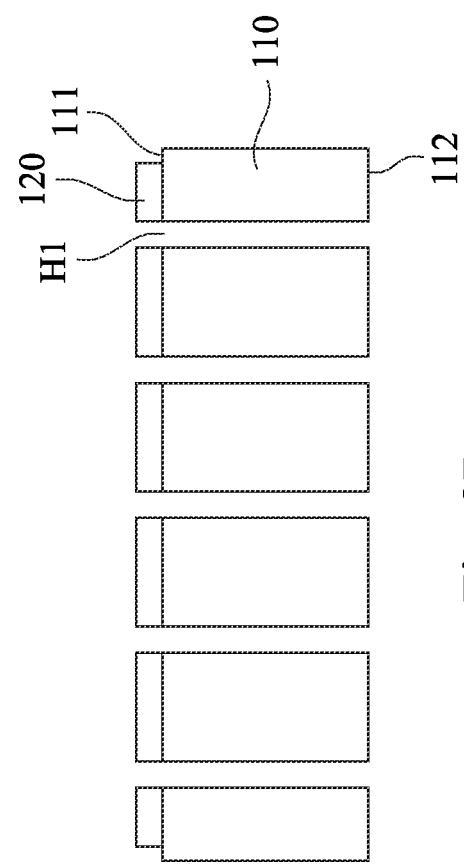
FIG. 2B depicts a cross-sectional view of the wound dressing along line A-A in FIG. 2A according to some embodiments of the present disclosure.

Embodiment 1, the Aspect of a Wound Dressing in Cooperation with an External Voltage A description is provided with reference to FIG. 2A and FIG. 2B. FIG. 2A depicts a top view of a wound dressing 100A. FIG. 2B depicts a cross-sectional view of the wound dressing 100A along line A-A in FIG. 2A.

As shown in FIG. 2A and FIG. 2B, the wound dressing 100A includes a porous substrate 110 and a functional layer 120 disposed on an upper surface 111 of the porous substrate 110. The functional layer 120 is in direct contact with the porous substrate 110. Additionally, the porous substrate 110 has a plurality of columnar holes H1 extending from the upper surface 111 to a lower surface 112. Diameters and shapes of the columnar holes H1 are consistent or similar (a similar size means that the size error is within 5%). When the columnar holes H1 are in a circular shape or close to a circular shape in the top view, a hole diameter is the diameter of the columnar holes H1. When the columnar holes H1 are in a rectangular shape or in an irregular shape in the top view, the hole diameter is a length of the columnar holes H1. In greater detail, the functional layer 120 is only disposed on the upper surface 111 of the porous substrate 110 and does not cover the columnar holes H1. In other words, the columnar holes H1 extend to the functional layer 120. It should be emphasized that the size and distribution of the columnar holes H1 in the figures are for illustration purpose only, and are not intended to represent the actual size and distribution.

A method of manufacturing the wound dressing 100A may include covering a functional layer material on the porous substrate 110, and cooling and solidifying the functional layer material. For example, a screen printing is adopted to print the functional layer material on the porous substrate 110.

A material of the porous substrate 110 in the wound dressing 100A adopts a fiber (such as a non-woven fiber or an electrospun fiber), which can be washed repeatedly to reduce waste of resources. A thickness of the porous substrate 110 is smaller than 1 millimeter (mm). A porosity of the columnar holes H1 in the porous substrate is from 20% to 60%. A hole diameter H1D of each of the columnar holes H1 is from 10 nm to 500 nm.

A material of the functional layer 120 in the wound dressing 100A (that is, the above functional layer material) includes an organic polymer having conductivity (such as modified polyvinyl alcohol, thermoplastic polyurethane, polyethylene terephthalate, or a combination thereof) and a conductive ink (conductive particles are distributed in an organic polymer, the conductive particles may include metal, graphite, or a combination thereof). When a weight percentage of the functional layer 120 is 100%, a weight percentage of the organic polymer in the functional layer 120 is from 30% to 70%. In some other embodiments, the material of the functional layer 120 may adopt an organic polymer that does not have conductivity and the conductive ink, and the conductive need of the functional layer 120 is realized through the conductive ink. It can be understood that, by mixing the organic polymer and the conductive ink, the functional layer 120 can be ensured to have good conductivity under the premise that the cost of the organic polymer is reduced to assist in transmitting microcurrents to the wound.

A description is provided with reference to FIG. 2C. FIG. 2C depicts a cross-sectional view of an external electrode E acting on the wound dressing 100A. A first electrode E1 (such as a positive electrode) and a second electrode E2 (such as a negative electrode) having opposite electrical polarities are respectively disposed at two end points of the functional layer 120, which can provide the functional layer 120 with a stable voltage.

Then, a description is provided with reference to FIG. 1 and FIG. 2C. When the wound dressing 100A is disposed on the wound W, the lower surface 112 of the porous substrate 110 is in direct contact with the wound W. The moisture in the air or the tissue fluid of the wound W can fill up the columnar holes H1, and ion charges are correspondingly formed on the functional layer 120 according to the charging situation of a surface of the functional layer 120. With a potential difference formed by the external electrode E and evaporation of the moisture, the electrons and charged ions can be driven to move, and microcurrents are formed through the assistance of the capillary action of the columnar holes H1 to be transmitted to the wound W through the columnar holes H1. In addition to that, the conductivity of the functional layer 120 can achieve the effects of improving the transmission efficiency and maintaining the long-term microcurrents at the same time.

Next, a description is provided with reference to FIG. 2C. Drop 1 milliliter of pure water onto the functional layer 120, and immediately measure a voltage and a current between the first electrode E1 and the second electrode E2 at both ends, and the results are shown in FIG. 2D.

Figure 2D:
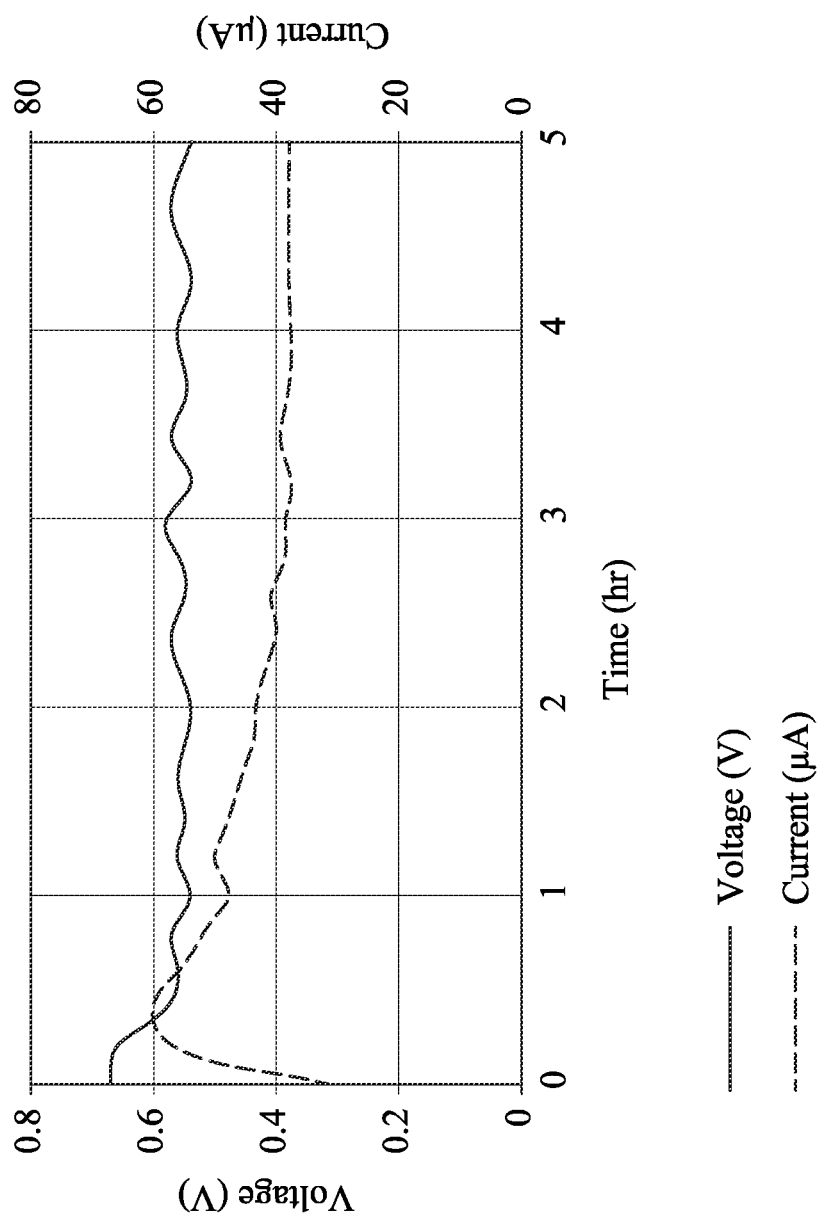
FIG. 2D is a measurement diagram of a voltage and a current of a wound dressing under the condition of disposing an external electrode on a functional layer according to some embodiments of the present disclosure.

As shown in FIG. 2D, under the steady supply of a voltage of about 0.5 volts to about 0.7 volts, the current can be measured to be stably maintained from about 30 microamperes (µA) to about 60 µA.

In addition, shapes and disposition methods of the porous substrate 110 and the functional layer 120 in the wound dressing 100A can further be adjusted depending on the needs of the wound.

Figure 2F:
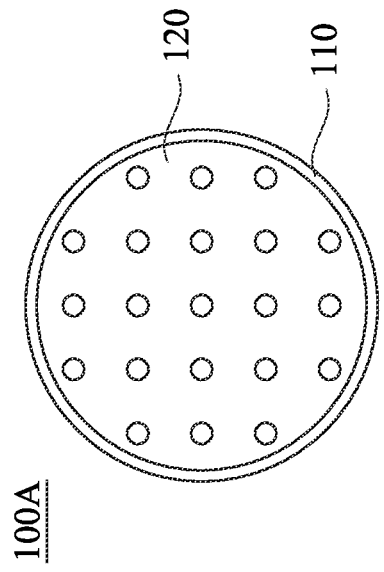
FIG. 2E, FIG. 2F, and FIG. 2G depict top views of shapes of a wound dressing according to some embodiments of the present disclosure.
Figure 2E:
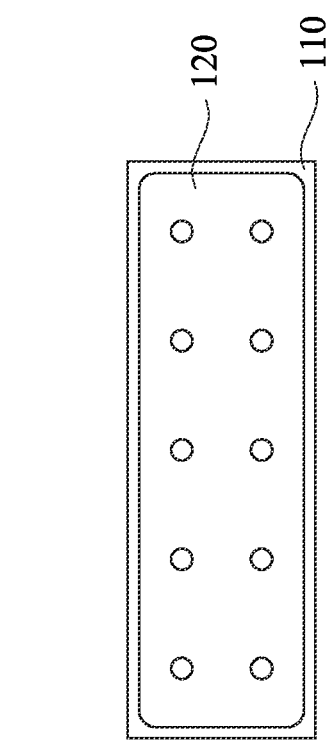
Figure 2G:
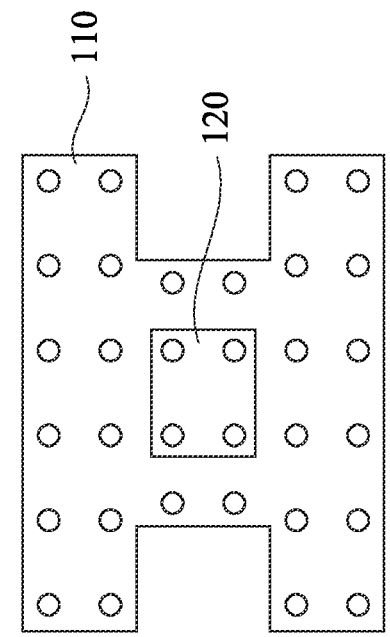

For example, a description is provided with reference to FIG. 2E to FIG. 2G (all are top views). The porous substrate 110 and the functional layer 120 in the wound dressing 100A of FIG. 2E are both in rectangular shapes, an area of the porous substrate 110 is larger than an area of the functional layer 120, and the two are overlapped. That is, the area of the porous substrate 110 is larger than an area of an orthogonal projection of the functional layer 120 onto the porous substrate 110. The porous substrate 110 and the functional layer 120 in the wound dressing 100A of FIG. 2F are both in circular shapes, the area of the porous substrate 110 is larger than that of the functional layer 120, and the two are overlapped. That is, the area of the porous substrate 110 is larger than the area of the orthogonal projection of the functional layer 120 onto the porous substrate 110. The porous substrate 110 in the wound dressing 100A of FIG. 2G is I-shaped. That is, the porous substrate 110 includes two parallel line parts and a middle part that connects the two line parts, and the functional layer 120 is in a rectangular shape and disposed on the middle part of the porous substrate 110. Additionally, an area of the middle part of the porous substrate 110 is larger than the area of the orthogonal projection of the functional layer 120 onto the porous substrate 110.

Embodiment 2, the Aspect of a Wound Dressing Generating Microcurrents by Itself

Figure 3A:
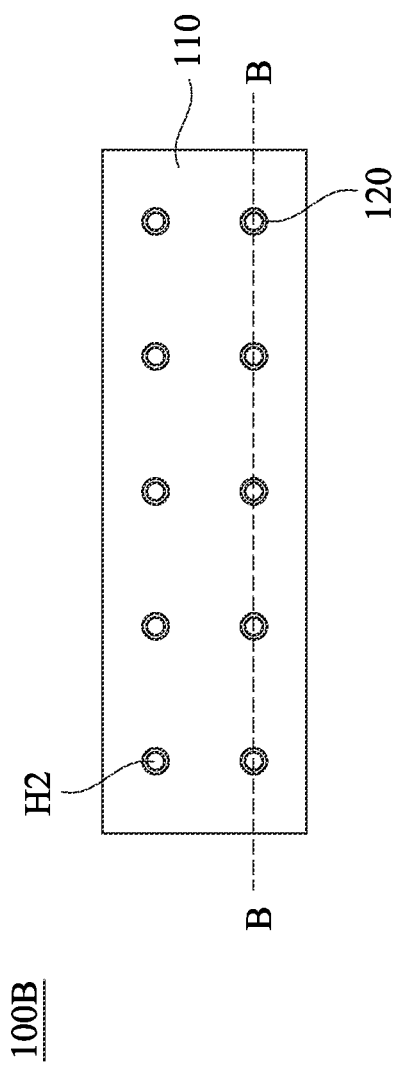
FIG. 3A depicts a top view of a wound dressing according to some other embodiments of the present disclosure.
Figure 3B:
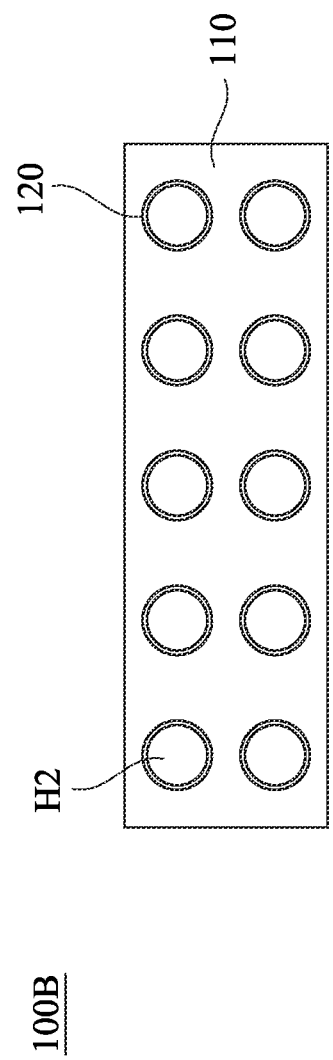
FIG. 3B depicts a bottom view of a wound dressing according to some other embodiments of the present disclosure.
Figure 3C:
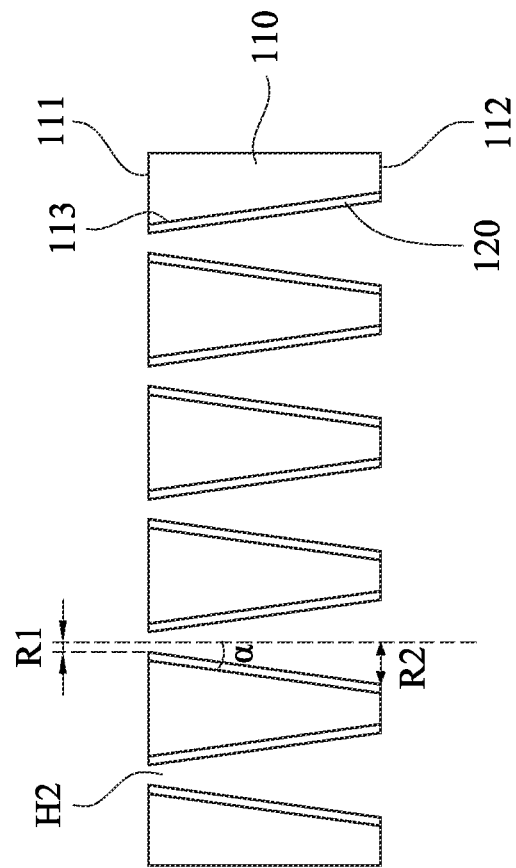
FIG. 3C depicts a cross-sectional view of the wound dressing along line B-B in FIG. 3A.

A description is provided with reference to FIG. 3A, FIG. 3B, and FIG. 3C. FIG. 3A depicts a top view of a wound dressing 100B. FIG. 3B depicts a bottom view of the wound dressing 100B. FIG. 3C depicts a cross-sectional view of the wound dressing 100B along line B-B in FIG. 3A.

As shown in FIG. 3A to FIG. 3C, the porous substrate 110 of the wound dressing 100B has conical holes H2 extending from the upper surface 111 to the lower surface 112. The functional layer 120 is disposed on a sidewall 113 of each of the conical holes H2, and the sidewalls 113 surround the conical holes H2. The functional layer 120 surrounds each of the conical holes H2. In some other embodiments, the functional layer 120 may be only disposed on part of each of the sidewalls 113. It should be emphasized that the size and distribution of the conical holes H2 in the figures are for illustration purpose only, and are not intended to represent the actual size and distribution.

A method of manufacturing the wound dressing 100B may include providing the porous substrate 110 having the conical holes H2 and coating a functional layer material that is charged on the sidewalls 113. The step of providing the porous substrate 110 having the conical holes H2 may include providing an initial substrate and etching the initial substrate (for example, use a conical tungsten wire to mark on the initial substrate, and then perform isotropic etching at the marked places) to form the plurality of conical holes H2. The step of coating the functional layer material that is charged on the sidewalls 113 may include coating an ionic membrane layer on the sidewalls 113, and then annealing the ionic membrane layer (for example, heat at a temperature of 100° C. to 150° C. for 30 minutes to 90 minutes) so as to obtain the functional layer 120. In some other embodiments, a plasma modification can further be performed on the annealed ionic membrane layer depending on needs to obtain the functional layer 120.

Another method of manufacturing the wound dressing 100B may include providing the porous substrate 110 having the conical holes H2 and performing a plasma modification on the sidewalls 113, so that surfaces of the sidewalls 113 are charged. The step of providing the porous substrate 110 having the conical holes H2 can be that as described in the previous paragraph, and a description in this regard is not repeated. As for the step of performing the plasma modification on the side walls 113, it may include performing an atmospheric plasma modification on the sidewalls 113 for 30 seconds to 60 seconds at a distance of about 1 centimeter (cm) from the sidewalls 113 with a power of 50 watts to 80 watts, so that the surfaces of the sidewalls 113 are positively charged or negatively charged to obtain the functional layer 120.

A material of the porous substrate 110 in the wound dressing 100b adopts a metal or an organic polymer (such as a plastic). The metal includes, for example, aluminum, gold, silver, stainless steel, or a combination thereof. The organic polymer includes, for example, polyvinyl alcohol, thermoplastic polyurethane, polyethylene terephthalate, or a combination thereof. Each of the conical holes H2 has a maximum radius R2 and a minimum radius R1. The minimum radius R1 is from 10 nm to 50 nm. An interval between the conical holes H2 is from 10 nm to 50 nm, and a slope α (the angle formed by the sidewall 113 and the perpendicular bisector of the conical hole H2) is from 10° to 30°.

A material of the functional layer 120 in the wound dressing 100b may the same as or different from the material of the porous substrate 110, but they both need to be charged (the surface is positively charged or negatively charged). For example, the functional layer 120 may adopt an ionic membrane layer, such as a polyperfluorosulfonic acid membrane (Nafion®) or a modified ionic membrane layer. In addition, a thickness of the functional layer 120 needs to be smaller than the minimum radius R1.

Next, a description is provided with reference to FIG. 1 and FIG. 3C. When the wound dressing 100B is disposed on the wound W, the upper surface 111 or the lower surface 112 of the porous substrate 110 can be used to directly contact the wound W. The moisture in the air or the tissue fluid of the wound W can fill up the conical holes H2, and form an electric double layer (EDL) on the functional layer 120 correspondingly according to the charging situation on a surface of the functional layer 120.

In greater detail, when the surface of the functional layer 120 is charged, it will cause counterions having an opposite electrical polarity to closely adhere to the surface of the functional layer 120 and fixed, which is a counterion layer (stern layer). Additionally, a coion layer (diffusion layer) having an opposite electrical polarity from that of the counterion layer is formed on the counterion layer. Charged ions in the diffusion layer can move freely, and the potential distribution gradually decreases as the distance from the functional layer 120 increases. Through the shape design of the conical holes H2, the coion layer of the conical holes H2 can be made to accumulate different degrees of charged ions with the change of the hole diameter so as to generate a potential difference. At the same time, through evaporation of the moisture and the capillary phenomenon in the conical holes H2, the counterion layer (or together with part of the coion layer) is further driven to flow due to the potential difference, thus forming microcurrents. The microcurrents are transmitted to the wound W through the conical holes H2. Therefore, the wound dressing 100 can employ the moisture or tissue fluid to generate the microcurrents by itself, without the necessity of being driven by an external electrode.

In summary, the wound dressing according to the present disclosure can absorb charged ions of the moisture or tissue fluid through disposing the functional layer. In addition to that, by using the external electrode to apply a voltage, or adjusting the hole shape of the porous substrate and cooperating with the design that the functional layer is charged, the potential difference is generated in the holes to form the microcurrents. As a result, when the wound dressing is applied to a wound, the bacterial biofilm formation in the wound is alleviated, which can accelerate wound healing.

The foregoing outlines features of several embodiments of the present disclosure so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A wound dressing comprising: a porous substrate comprising: an upper surface; a lower surface opposite to the upper surface; and a plurality of conical holes extending from the upper surface to the lower surface; and a functional layer disposed on the porous substrate and a side wall of each of the plurality of conical holes, wherein the functional layer is charged or has conductivity.

2. The wound dressing of claim 1, wherein a material of the porous substrate comprises a metal, an organic polymer, a fiber, or a combination thereof.

3. The wound dressing of claim 1, wherein a material of the functional layer comprises a metal, an organic polymer, a graphite, or a combination thereof.

4. The wound dressing of claim 1, wherein a thickness of the porous substrate is from 5 μm to 1000 μm.

5. The wound dressing of claim 1, wherein two opposite sides of each of the plurality of conical holes respectively have a maximum radius and a minimum radius, wherein the minimum radius is from 10 nm to 50 nm.

6. The wound dressing of claim 1, wherein materials of the functional layer and the porous substrate are different.

7. The wound dressing of claim 1, wherein materials of the functional layer and the porous substrate are the same.

* * * * *